(12) United States Patent
Yang et al.

(10) Patent No.: US 10,910,622 B2
(45) Date of Patent: Feb. 2, 2021

(54) CONNECTION MEMBER AND RECHARGEABLE BATTERY

(71) Applicant: Contemporary Amperex Technology Co., Limited, Ningde (CN)

(72) Inventors: Jiandong Yang, Ningde (CN); Jian Guo, Ningde (CN); Chengyou Xing, Ningde (CN); Xiaowen Zhang, Ningde (CN); Haizu Jin, Ningde (CN); Yongshou Lin, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 215 days.

(21) Appl. No.: 16/234,955

(22) Filed: Dec. 28, 2018

(65) Prior Publication Data

US 2019/0221813 A1   Jul. 18, 2019

(30) Foreign Application Priority Data

Jan. 16, 2018   (CN) .......................... 2018 1 0039471

(51) Int. Cl.
*H01M 2/20* (2006.01)
*H01M 2/26* (2006.01)
*H01M 10/0525* (2010.01)

(52) U.S. Cl.
CPC .......... *H01M 2/202* (2013.01); *H01M 2/263* (2013.01); *H01M 10/0525* (2013.01); *H01M 2200/20* (2013.01)

(58) Field of Classification Search
None
See application file for complete search history.

(56) References Cited

U.S. PATENT DOCUMENTS 9,577,229 B2 *  2/2017  Byun ..................... H01M 2/266
10,297,809 B2 *  5/2019  Jang ........................ H01M 2/20
(Continued)

FOREIGN PATENT DOCUMENTS

CN       103035874 A      4/2013
CN       103367668 A     10/2013
(Continued)

OTHER PUBLICATIONS

Extended European Search Report for European Patent Application No. 18248061.6 dated May 31, 2019.
(Continued)

*Primary Examiner* — Kaity V Chandler
(74) *Attorney, Agent, or Firm* — Heslin Rothenberg Farley & Mesiti P.C.

(57) ABSTRACT

A connection member and a rechargeable battery are provided. The connection member includes a guide plate, two first connection plates and a second connection plate; the two first connection plates are respectively connected to two sides of the guide plate in a width direction and are arranged bendably with respect to the guide plate; the second connection plate is connected to an upper end of the guide plate in a height direction Z, and the top ends of the two first connection plates are at different heights. In some examples, overcurrent capability of the connection member and rapid charging capability and safety performance of the rechargeable battery can be improved.

14 Claims, 12 Drawing Sheets

(56) References Cited

U.S. PATENT DOCUMENTS

| | | | |
|---|---|---|---|
| 2011/0039152 A1* | 2/2011 | Kim | H01M 2/1022 |
| | | | 429/178 |
| 2011/0171516 A1* | 7/2011 | Byun | H01M 2/263 |
| | | | 429/161 |
| 2011/0250491 A1* | 10/2011 | Kim | H01M 2/34 |
| | | | 429/176 |
| 2012/0135283 A1* | 5/2012 | Lee | H01M 10/0587 |
| | | | 429/82 |
| 2014/0349149 A1* | 11/2014 | Kim | H01M 2/263 |
| | | | 429/61 |
| 2015/0072186 A1* | 3/2015 | Guen | H01M 10/425 |
| | | | 429/61 |
| 2015/0221920 A1* | 8/2015 | Guen | H01M 10/0422 |
| | | | 429/185 |
| 2017/0125778 A1* | 5/2017 | Iwasa | H01M 10/0431 |
| 2017/0358790 A1* | 12/2017 | Kishimoto | H01M 2/263 |
| 2019/0067664 A1* | 2/2019 | Kwak | H01M 2/0456 |
| 2019/0067667 A1* | 2/2019 | Jang | H01M 2/266 |

FOREIGN PATENT DOCUMENTS

| | | |
|---|---|---|
| CN | 109428046 A | 3/2019 |
| EP | 2846378 A1 | 3/2015 |
| EP | 3133673 A1 | 2/2017 |
| EP | 3451415 A1 | 3/2019 |
| WO | 2012176704 A1 | 12/2012 |

OTHER PUBLICATIONS

The first examination report dated Sep. 25, 2019 for European Application No. 18248061.6, 5 pages.
The first Official Action and search report dated Apr. 17, 2020 for Chinese application No. 201810039471.1, 9 pages.

* cited by examiner

CONNECTION MEMBER AND RECHARGEABLE BATTERY

CROSS REFERENCE TO RELATED APPLICATIONS

The present application claims priority to Chinese Patent Application No. 201810039471.1 filed on Jan. 16, 2018 and entitled "CONNECTION MEMBER AND RECHARGEABLE BATTERY", the disclosure of which is incorporated herein by reference in its entirety.

TECHNICAL FIELD

The present disclosure relates to battery technologies, and more particularly, to a connection member and a rechargeable battery.

BACKGROUND

With the development of science and technology, demands on rechargeable batteries are getting higher and higher. Taking a lithium ion battery as an example, it has the advantages of high energy density, high power density, being recyclable for many times, long storage time and the like, and is widely used in portable electronic devices, such as a mobile phone, a digital video camera, a handheld computer and the like, has wide application prospect in the aspects of electrical vehicles, such as an automobile, an electric bicycle and the like, and large and medium-sized electrical devices, such as energy storage facilities and the like, and becomes an important technical means for solving global problems of energy crisis, environment pollution and the like. Devices, such as an electric vehicle and the like, which needs to use the rechargeable battery, puts forward higher requirements for rapid charging capability, energy density and safety performance of the rechargeable battery which provides energy to the devices.

In a prismatic rechargeable battery in the existing technology, tabs of a cell are connected with a connection member. A first connection plate of the connection member, which is connected with the tabs, generally is in parallel to a longitudinal direction of the cell. As the market demands more and more large-current batteries, in order to meet the overcurrent-temperature rise requirement of the battery, a sufficient welding area between the first connection plates and the tabs is required, so that the first connection plate needs to have a sufficient size in the longitudinal direction of the cell, which certainly will occupy more space to cause a low space utilization rate and a low energy density of the cell.

SUMMARY

In a first aspect, the present disclosure provides a connection member of a rechargeable battery. The connection member includes a guide plate, two first connection plates and a second connection plate, the two first connection plates are respectively connected to both sides of the guide plate in a width direction and arranged bendably with respect to the guide plate, the second connection plate is connected to an upper end of the guide plate in a height direction Z, and top ends of the two first connection plates are at different heights.

In some embodiments, a ratio of a height difference between the top ends of the two first connection plates to a plate height of the first connection plate which has a smaller plate height of the two first connection plates is 0.01 to 0.25.

In some embodiments, the guide plate includes a main plate and an epitaxial plate, the two first connection plates are connected to the main plate, the epitaxial plate is spaced above one of the two first connection plates and extend towards an outside of the main plate along the width direction.

In some embodiments, the guide plate includes two epitaxial plates, each of the two epitaxial plates corresponds to one of the two first connection plates.

In some embodiments, a ratio of a gap between one of the two first connection plates which has a higher top end of the two first connection plates and the corresponding epitaxial plate to the plate height of one of the two first connection plates which has a smaller plate height of the two first connection plates is 0.006 to 0.15; and/or, a ratio of a gap between one of the two first connection plates which has a lower top end of the two first connection plates and the corresponding epitaxial plate to a plate height of one of the two first connection plates which has a smaller plate height of the two first connection plates is 0.006 to 0.15.

In some embodiments, the second connection plate and the guide plate are integrally formed by bending, and at least one convex mark is formed at the bent position between the guide plate and the second connection plate.

In some embodiments, at least one indentation is formed at a bent position between one of the two first connection plates and the guide plate.

In some embodiments, a crack-arrest notch is formed at an end portion of the joint between one of the two first connection plates and the guide plate.

In some embodiments, a thickness of each of the two first connection plates is less than that of the guide plate.

In a second aspect, the present disclosure provides a rechargeable battery, including two or more cells and any one of the above-mentioned connection members in the first aspect of the present disclosure, each of the two first connection plates is connected with tabs of the cells.

In some embodiments, the two first connection plates are bent towards an outside of the guide plate along the width direction, respectively.

In some embodiments, the guide plate at least partially protrudes towards a main body of the cells with respect to the first connection plates to form a protrusion, and the protrusion is pressed against the tabs of the cells or the protrusion is pressed against the main body of the cells.

In some embodiments, the tabs extend from one side of the main body of the cell in a width direction.

In some embodiments, a ratio of a height difference between the top ends of the two first connection plates to a plate height of one of the two first connection plate which has a smaller plate height of the two first connection plates is 0.01 to 0.25.

In some embodiments, the guide plate comprises a main plate and an epitaxial plate, the two first connection plates are connected to the main plate, the epitaxial plate is spaced above one of the two first connection plates and extends towards an outside of the main plate along the width direction.

In some embodiments, a ratio of a gap between one of the two first connection plates which has a higher top end of the two first connection plates and the corresponding epitaxial plate to a plate height of one of the two first connection plates which has a smaller plate height of the two first connection plates is 0.006 to 0.15; and/or, a ratio of a gap between one of the two first connection plates which has a lower top end of the two first connection plates and the corresponding epitaxial plate to a plate height of one of the first connection plates which has a smaller plate height of the two first connection plates is 0.006 to 0.15.

In some embodiments, the second connection plate and the guide plate are integrally formed by bending, and at least one convex mark is formed at a bent position between the guide plate and the second connection plate.

In some embodiments, at least one indentation is respectively formed at a bent portion between one of the two first connection plates and the guide plate.

In some embodiments, the guide plate is in contact with a surface at one end of the main body of the cells.

In some embodiments, the two first connection plates are bent towards an inside of the guide plate along the width direction, respectively.

The rechargeable battery provided by the present disclosure includes the above-mentioned connection member so as to have all the advantages of the connection member.

By detail description on exemplary embodiments of the present disclosure in the reference accompanying drawings below, other characteristics and advantages of the present disclosure will become clear.

BRIEF DESCRIPTION OF THE DRAWINGS

The accompanying drawings illustrated herein are used for providing further understanding on the present disclosure and constitute one part of this disclosure, and exemplary embodiments of the present disclosure and the illustration thereof are used for explaining the present disclosure and do not constitute improper limitation to the present disclosure. In the accompanying drawings.

DETAILED DESCRIPTION

Figure 1:
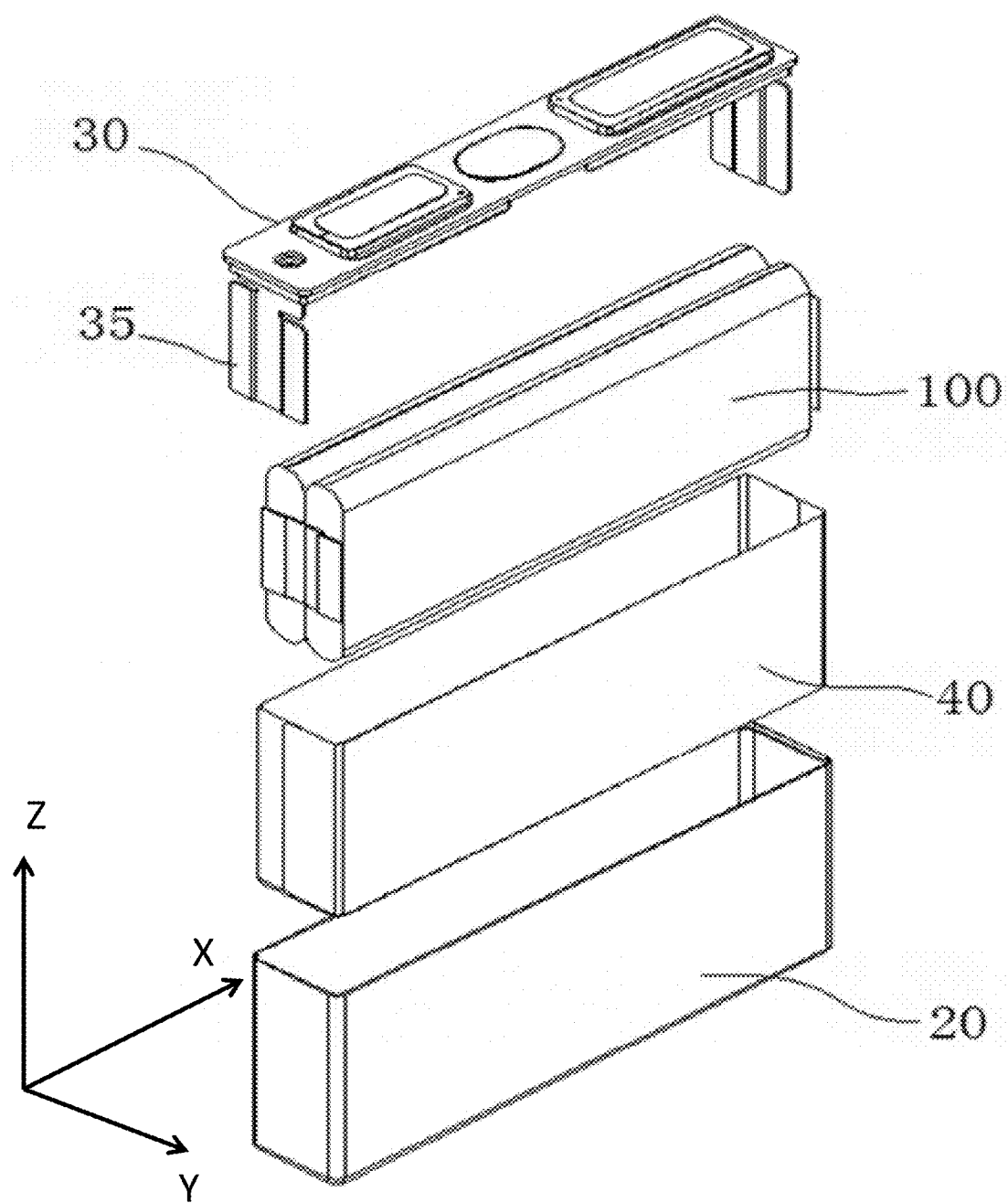
FIG. 1 is a structural schematic diagram showing an exploded view of a rechargeable battery according to an embodiment of the present disclosure.
Figure 2:
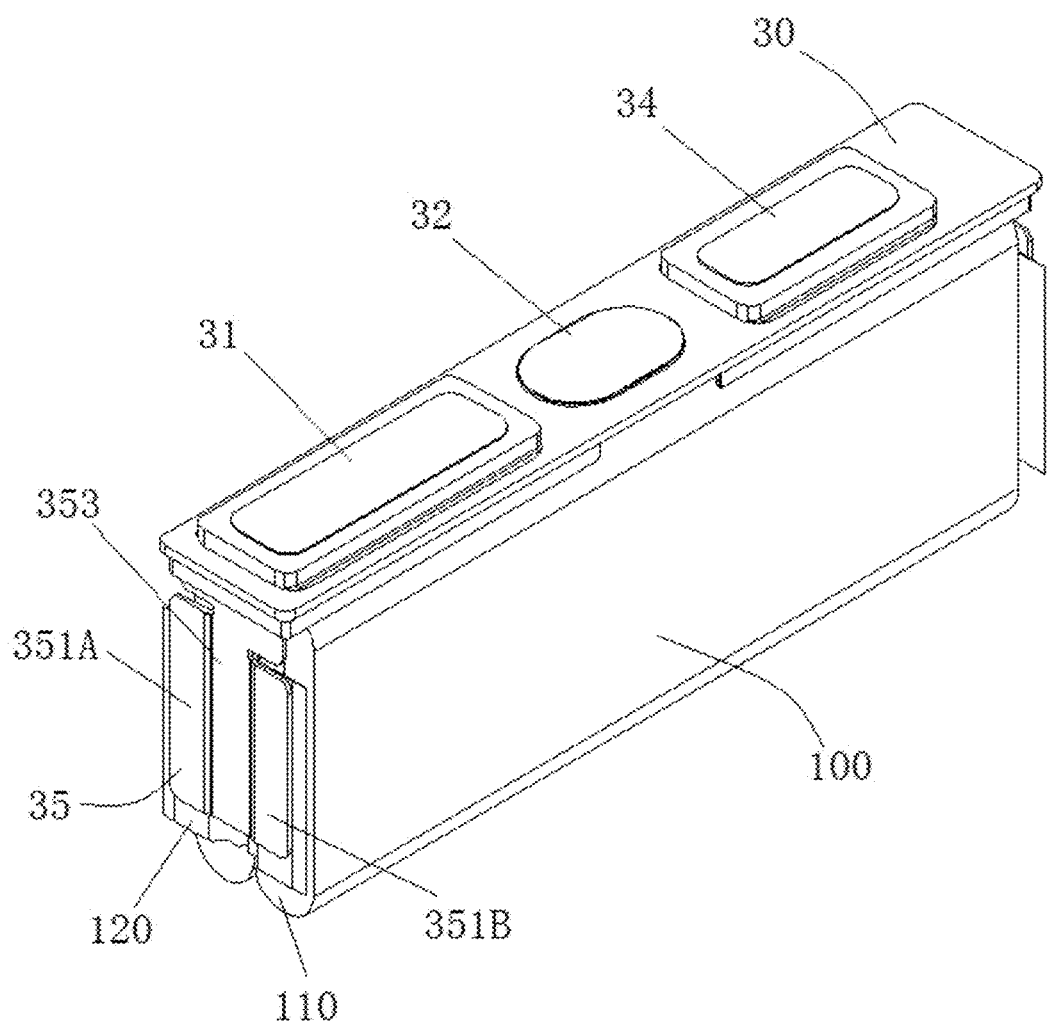
FIG. 2 is a structural schematic diagram showing the rechargeable battery shown in FIG. 1 in which a shell is removed.
Figure 3:
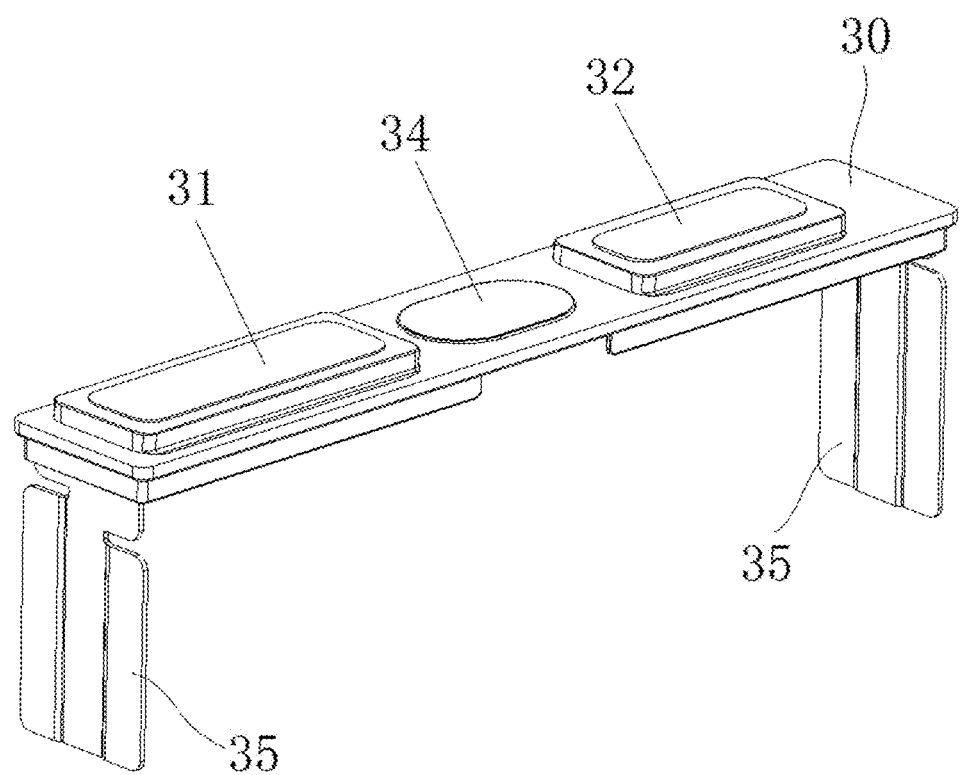
FIG. 3 is a schematic diagram showing a connection structure of a top cover and a connection member of the rechargeable battery shown in FIG. 1.

The technical solution in the embodiments of the present disclosure will be described in a clearly and fully understandable way in connection with the drawings of the embodiments of the disclosure. It is obvious that the described embodiments are just some but not all embodiments of the disclosure. The description on at least one exemplary embodiment below actually is merely illustrative, but definitely does not make any limit to the present disclosure or application and use thereof. Based on the embodiments of the disclosure, all other embodiment(s) obtained by those skilled in the art without any inventive work should be within the scope of protection of the disclosure.

Unless specifically otherwise defined, relative arrangement, number expressions and values of parts and steps illustrated in those embodiments do not make any limit to the scope of the present disclosure. Meanwhile, it should be understood that in order to facilitate description, the size of each portion shown in the drawings is not drawn according to an actual proportional relationship. Technologies, methods and devices known by those skilled in the existing arts may be not discussed in detail, but in proper cases, the technologies, methods and devices should be regarded as one part of the granted specification. In all examples shown and discussed herein, any specific value should be explained to be merely exemplary, but not limitative. Therefore, other examples of the exemplary embodiments may have different values. It should be noted that similar reference signs and letters represent similar terms in the drawings below, and thus, once a certain term is defined in one drawing, it is not desired that the term shall be further discussed in the subsequent drawings.

In the description of the present disclosure, it should be understood that words for defining parts, such as "first", "second" and the like, merely mean to facilitate distinguishing the corresponding parts, and unless otherwise statement, the above-mentioned words do not have special meanings, and are not limitative of the present disclosure.

In the description of the present disclosure, it should be understood that the singular forms, "a," "an," and "the" are intended to include the plural forms as well, unless context clearly indicates otherwise.

In the description of the present disclosure, it should be understood that directional or positional relationships shown by directional terms such as "front, rear, upper, lower, left and right", "transverse, vertical, perpendicular and horizontal", "top and bottom" and the like generally are directional or positional relationships shown as in the drawings, which only mean to facilitate description of the present disclosure and simplify the description, but in cases of no reverse explanation, do not indicate or imply that the devices or components must have specific directions, or be constructed or operated in the specific directions, and are not limitative of the scope of the present disclosure; and directional terms such as "inner and outer" mean inner and outer with respect to the contour of each component.

In the description of this disclosure, the "longitudinal direction" means a longitudinal direction of a rechargeable battery, is also a longitudinal direction of a cell 100, and corresponds to an X direction in FIG. 1; the "width direction" means a width direction of the rechargeable battery and corresponds to a Y direction in FIG. 1, and the "width direction" is also a width direction of a connection member and a guide plate thereof; and the "height direction" means a direction perpendicular to the longitudinal direction and the width direction and corresponds to a Z direction in FIG. 1, and the "height direction" is a height direction of the rechargeable battery and a cell and is also a height direction of the connection member and the guide plate thereof.

Figure 14:
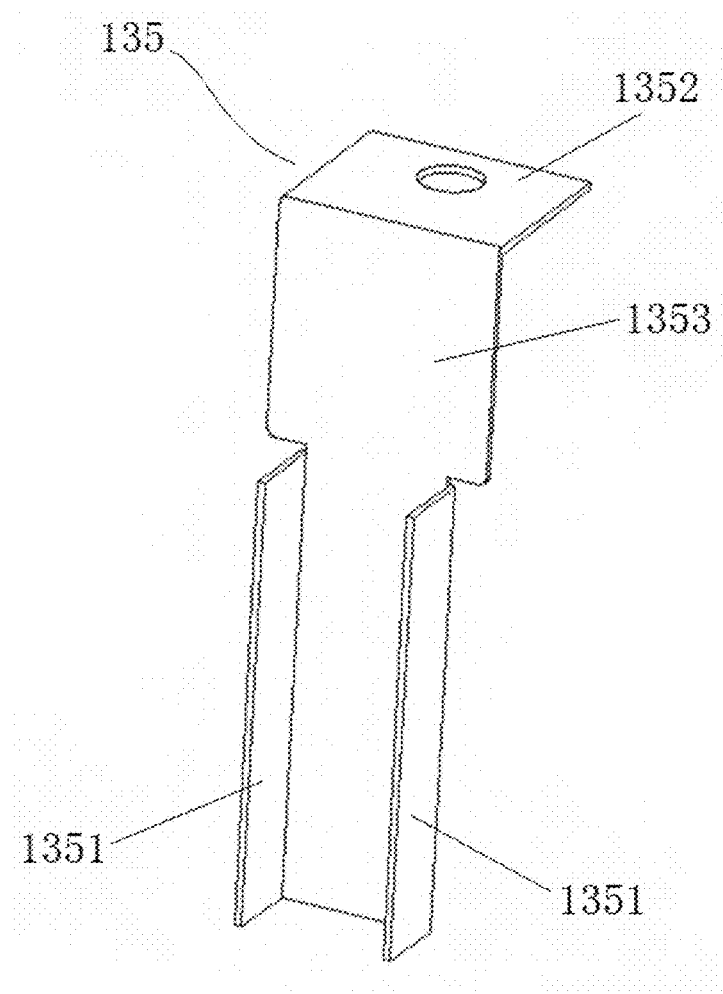
FIG. 14 is a structural schematic diagram of a connection member in a comparison embodiment.

In existing technologies, there is a connection technique in which the first connection plate of the connection member is perpendicular to the longitudinal direction of the cell and meanwhile, the tabs are bent, and such technique is beneficial for improving the energy density of the rechargeable battery. FIG. 14 shows a structural schematic diagram of an existing connection member. In the figure, the connection member 135 includes a guide plate 1353, two first connection plates 1351 connected to both sides of the guide plate 1353 respectively in a width direction, and a second connection plate 1352 connected to the upper end of the guide plate. The first connection plates 1351 are arranged bendably with respect to the guide plate 1353.

In the process of implementing the present disclosure, a designer finds that in the rechargeable battery with the connection member as shown in FIG. 14, of which the first connection plates are perpendicular to the longitudinal direction of the cell, in order to implementing bending of the first connection plates, the connection member may have regions where resistances are locally increased at positions corresponding to the top ends of the guide plate and two first connection plates, so as to affect overcurrent capability of the connection member and affect rapid charging capability of the rechargeable battery.

In view of this, some embodiment of the present disclosure is to provide a connection member and a rechargeable battery, in order to improve overcurrent capability of the connection member and rapid charging capability of the rechargeable battery.

FIGS. 1 to 13 show structures of a rechargeable battery and parts thereof according to each embodiment of the present disclosure.

As shown in FIGS. 1 to 13, an embodiment of the present disclosure provides a connection member 35 of a rechargeable battery, which is used for connecting a cell 100 of the rechargeable battery and an exterior of the rechargeable battery. The connection member 35 includes a guide plate 353, a first connection plate 351A, a first connection plate 351B and a second connection plate 352. Two first connection plates 351A and 351B are respectively connected to two sides of the guide plate 353 in a width direction Y and are arranged bendably with respect to the guide plate 353. The second connection plate 352 is connected to an upper end of the guide plate 353. Top ends of the two first connection plates 351A and 351B are at different heights. In one example, the cell 100 includes two groups of battery cells, as shown in the drawings. Also, each group can include one, two, three or more battery cells.

Due to a larger and larger demand on rapid charging of the rechargeable battery, the connection member 35 needs to have a relatively large overcurrent area. Since the first connection plates have the bending demand, portions of the guide plate 353, which are connected with the first connection plates, are limited in width and sometimes may be only set to be relatively narrow, so that a necked port is formed on a current transfer path of the connection member 35. If the tops of the first connection plates on both sides of the guide plate 353 are consistent in height, a size of the necked port is a width size of the guide plate 353 at the height positions of the tops of the two first connection plates. But in the connection member provided by the present disclosure, top ends of the two first connection plates are at different heights, and then the size of the necked port is changed into a size of a connection line of points on both sides of the guide plate in the width direction at the corresponding heights of the two first connection plates, thereby enlarging the overcurrent area and benefiting for improving overcurrent capability of the connection member and rapid charging capability and safety performance of the rechargeable battery.

The rechargeable battery according to the embodiments of the present disclosure includes the above-mentioned connection member 35, thereby having all the advantages of the connection member 35.

The embodiments of the present disclosure will be illustrated in detail below in connection with FIGS. 1 to 13.

In the embodiment shown in FIGS. 1 to 9, as shown in FIGS. 1 to 3 and 5 to 9, the connection member 35 includes the guide plate 353, two first connection plates 351A and 351B and the second connection plate 352.

A first connection plate 351A or 351B is used for being connected with tabs 120 of a cell 100. Two first connection plates 351A and 351B are respectively connected to two sides of the guide plate 353 in the width direction. The second connection plate 352 is connected to the upper end of the guide plate 353. In this embodiment, the top end of the first connection plate 351A is higher than that of the first connection plate 351B. Bottom ends of the two first connection plates 351A and 351B are flush.

In embodiments not shown in the drawings, the top end of the first connection plate 351A may also be lower than that of the first connection plate 351B, or the bottom ends of the two first connection plates 351A and 351B may also be different in height, and for example, the bottom end of the first connection plate 351A may also be higher or lower than that of the first connection plate 351B.

The second connection plate 352 is used for forming an electrical connection between the cell 100 of the rechargeable battery and the exterior of the rechargeable battery. The second connection plate 352 is connected to the upper end of the guide plate 353 in a height direction Z. After the rechargeable battery is assembled up, the second connection plate 352 is positioned above the cell 100, and is bent with respect to the guide plate 353 towards the cell 100. In this embodiment, the second connection plate 352 is connected with an electrode part arranged on a top cover 30 of the rechargeable battery.

In the embodiments not shown in the drawings, the second connection plate may also be used as the electrode part of the rechargeable battery without specially providing the electrode part.

In this embodiment, the second connection plate 352 is provided with a welding connection portion 3521 for connecting to the electrode part. In order to accurately position a welding position where the second connection plate 352 is welded to the electrode part, a first positioning hole may be formed on the welding connection portion 3521. A second positioning hole may also be formed at other position at the second connection plate 352, which do not belong to the welding connection portion 3521.

Figure 9:
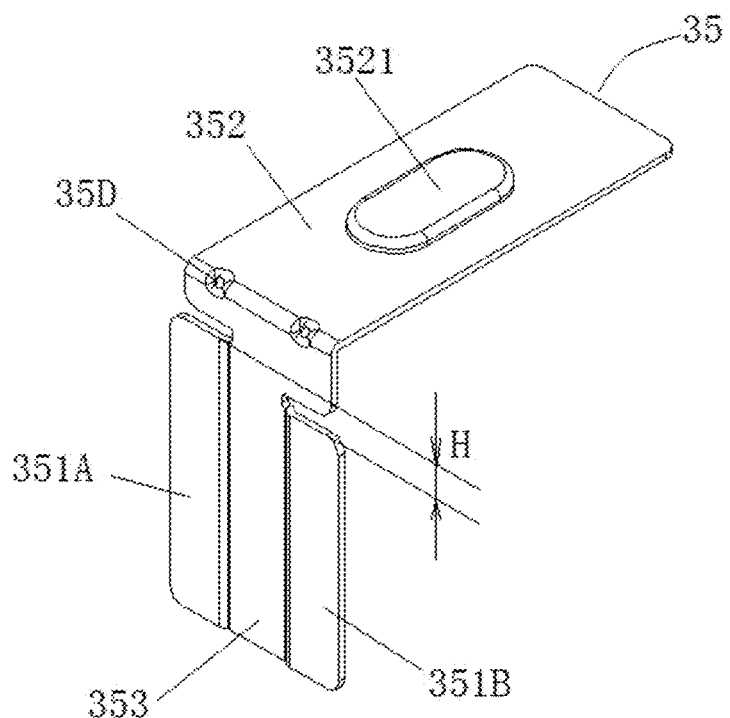
FIG. 9 is a structural schematic diagram showing a connection member shown in FIG. 8 after the first connection plate is bent with respect to the guide plate.

In FIG. 9, H represents a height difference between the top end of the first connection plate 351A and the top end of the first connection plate 351B. Preferably, a ratio of the height difference H between the top end of the first connection plate 351A and the top end of the first connection plate 351B to a plate height of the first connection plate 351B which has a smaller plate height of the two first connection plates 351A and 351B is 0.01 to 0.25. The greater the height difference H is, the larger the overcurrent capability is, and the less the heat generating at this position is, and thus, by reasonably setting the height difference H, overcurrent capability of the connection member can meet demands that is to obtain an optimal total resistance, meanwhile, the dimensional requirement of connection between the first connection plate and the cell is met, to ensure a contact area between the first connection plate and the cell, and a heating value is small.

In some preferred embodiments, the guide plate 353 includes a main plate 3531 and epitaxial plates, two first connection plates 351A and 351B are connected to the main plate 3531, the epitaxial plates are spaced above the corresponding first connection plates respectively and extend towards an outside of the main plate 3531 along the width direction.

The arrangement of the epitaxial plates is more beneficial for enlarging the overcurrent area and reducing a resistance of the guide plate 353 and beneficial for improving rapid charging capability and safety performance of the rechargeable battery.

As shown in FIGS. 1 to 3 and 5 to 9, in this embodiment, the guide plate 353 includes an epitaxial plate 3533 corresponding to the first connection plate 351A, and an epitaxial plate 3534 corresponding to the first connection plate 351B.

In a preferred embodiment, a ratio of a gap between the first connection plate, which has a higher top end of the two first connection plates, and the corresponding epitaxial plate to the plate height of the first connection plate which has a smaller plate height of the two first connection plates is 0.006 to 0.15. Such arrangement is beneficial for smoothly bending the first connection plates. Accordingly, in this embodiment, the ratio is a ratio of the gap between the first connection plate 351A and the epitaxial plate 3533 to the plate height of the first connection plate 351B.

In a preferred embodiment, a ratio of the gap between the first connection plate, which has a lower top end of the two first connection plates, and the corresponding epitaxial plate to the plate height of the first connection plate which has a smaller plate height of the two first connection plates is 0.006 to 0.15. Such arrangement is beneficial for smoothly bending the first connection plates. Accordingly, in this embodiment, the ratio is a ratio of the gap between the first connection plate 351B and the epitaxial plate 3534 to the plate height of the first connection plate 351B.

In this embodiment, the gap between the first connection plate 351A and the epitaxial plate 3533 may be equal to or unequal to the gap between the first connection plate 351B and the epitaxial plate 3534.

In addition, in a preferred embodiment, the guide plate 353 and the second connection plate 352 are integrally formed by bending a sheet, and at least one convex mark 35D is formed at the bent position between the guide plate 353 and the second connection plate 352.

Figure 8:
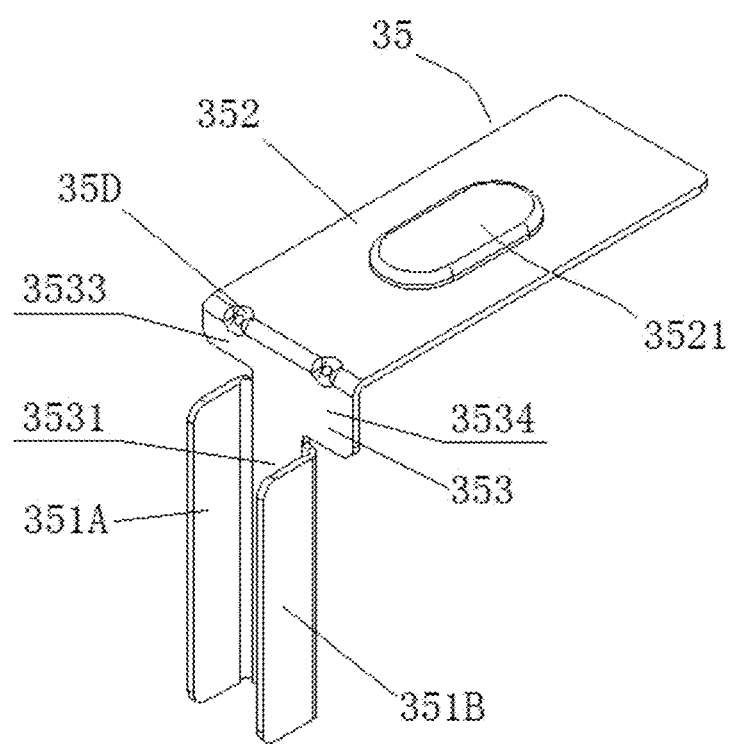
FIG. 8 is a structural schematic diagram showing a connection member according to the embodiment shown in FIG. 1 before a first connection plate is bent with respect to a guide plate.

As shown in FIGS. 8 and 9, the guide plate 353 and second connection plate 352 of the connection member 35 are integrally formed by bending, and two convex marks 35D are formed at the bent position between the guide plate 353 and the second connection plate 352. In this embodiment, the two convex marks 35D are uniformly spaced along the bent position between the guide plate 353 and the second connection plate 352.

The convex marks 35D can facilitate the guide plate 353 and the second connection plate 352 to keep at relative positions when the first connection plates are bent, so that when the rechargeable battery is assembled, mutual positions of each part connected with the connection member 35, such as the cell 100, the top cover 30, a shell 20 and the like, are accurate and uniform, which is beneficial for smoothly completing the assembling work and is also beneficial for improving quality of the rechargeable battery. Moreover, when the rechargeable battery is impacted or vibrated, a deformation amount of the guide plate 353 with respect to the second connection plate 352 can be reduced so as to benefit protection to the tabs 120.

As shown in FIGS. 1 to 9, in this embodiment, the first connection plate 351A and the first connection plate 351B are arranged bendably and towards an outside of the guide plate 353 respectively.

According to the embodiment of the present disclosure, the rechargeable battery includes the cell 100 and the above-mentioned connection member 35, and the first connection plates of the connection member 35 are connected with the tabs 120 of the cell 100.

In the embodiment shown in FIGS. 1 to 9, the rechargeable battery includes the shell 20, the top cover 30, the cell 100 and the connection member 35. As shown in FIG. 1, in this embodiment, the shell 20 is a metal shell, and in order to prevent electricity leakage of the shell 20, the rechargeable battery may further include an insulation layer 40. The insulation layer 40 is arranged between the connection member 35 and the shell 20.

The shell 20 and the top cover 30 form a mounting space, and the cell 100 and the portions of the guide plate 353 and the first connection plates 351A and 351B of the connection member 35 below the top cover 30 are positioned in the mounting space.

The second connection plate 352 of the connection member 35 is connected with the electrode part on the top cover 30. Specifically, the welding connection portion 3521 is arranged on the second connection plate 352, and the second connection plate 352 is welded and connected with the electrode part by the welding connection portion 3521.

The electrode part on the top cover 30 includes a positive electrode part 31 for connecting to a positive pole of the cell 100 and a negative electrode part 34 for connecting to a negative pole of the cell 100. An explosion-proof valve 32 is also arranged on the top cover 30. Other structures, such as a liquid filling hole and the like, can also be arranged on the top cover 30.

The connection member 35 of the rechargeable battery generally may be firstly fixedly connected with the top cover 30 and the electrode part thereon, and then be connected with the cell 100. When the connection member 35 is connected with the cell 100, after the position of the guide plate 353 with respect to a main body 110 of the cell 100 is determined, the first connection plates 351A and 351B are fixedly connected with the tabs 120 with a certain angle with respect to the end face of the main body 110 of the cell 100, then the first connection plates 351A and 351B are bent to assembling positions, and the tabs 120 are simultaneously bent with respect to a longitudinal direction X of the main body 110 of the cell 100. For example, in this embodiment, the first connection plates 351A and 351B are bent to be in parallel to the end face of the main body 110 of the cell 100. After the connection member 35 and the cell 100 are assembled, the connection member 35 and the cell 100 are placed into the shell 20 together. After the connection member 35 and the cell 100 are placed well, the top cover 30 just covers an opening of the shell 20, and then the top cover 30 and the shell 20 are sealed.

As shown in FIGS. 1, 2 and 4 to 7, in this embodiment, the cell 100 includes the main body 110 of the cell 100 and the tabs 120 extending away from the main body 110.

The cell 100 is a prismatic cell formed by winding after overlaying a positive plate, an isolation film and a negative plate. A width direction of the positive plate, the isolation film and the negative plate form the longitudinal direction X of the cell 100.

The positive plate and the negative plate respectively include a substrate and an active material coated on the substrate. A coating region is formed in a region on the substrate, where the active material is coated. The isolation film is used for isolating the positive plate from the negative plate so as to prevent the short circuit inside the rechargeable battery. The substrate of the positive plate may be a first metal foil, e.g., an aluminium foil; and the substrate of the negative plate may be a second metal foil, e.g., a copper foil.

The cell 100 includes a positive tab and a negative tab. The positive tab is formed by a portion at the edge of one side of the first metal foil, which is uncoated with the active material. The negative tab is formed by a portion at the edge of one side of the second metal foil, which is uncoated with the active material. In this embodiment, the positive tab and the negative tab are positioned at two ends of the cell 100 respectively in the longitudinal direction X, and protrude from the corresponding end portions of the isolation film respectively.

Figure 4:
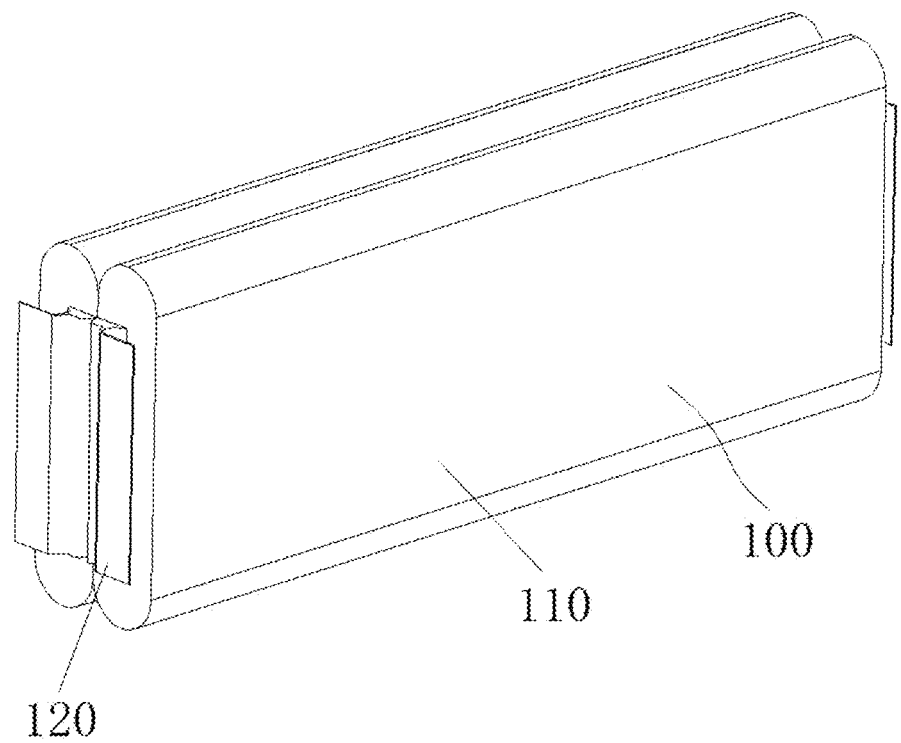
FIG. 4 is a structural schematic diagram of a cell component of the rechargeable battery shown in FIG. 1.
Figure 5:
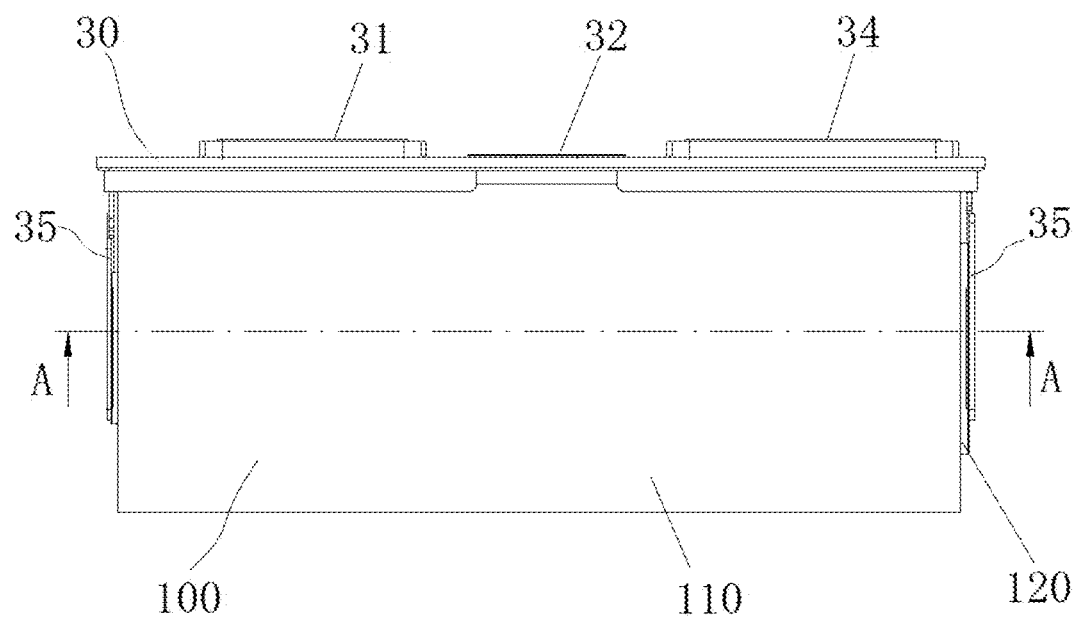
FIG. 5 is a structural schematic diagram showing a side-view of FIG. 2.

As shown in FIG. 4, in the cell 100 in this embodiment, the tabs 120 extend from one side of the main body 110 in the width direction Y. In this embodiment, the tabs 120 are arranged at one side with respect to center plane of the main body 110 in the width direction Y, so that in the premise of ensuring that the tabs have a sufficient overcurrent area, a thickness of the tabs 120 is effectively reduced. By the arrangement, after the first connection plates 351A and 351B are bent with respect to the guide plate 353, a size occupied by the tabs 120 in the longitudinal direction X of the cell 100 is thinned, so that the first connection plates 351A and 351B can be arranged to be closer to the main body 110, and the overall size of the connection member 35 and the cell 100 in the longitudinal direction X is reduced, thereby improving the energy density of the rechargeable battery. In addition, the tabs 120 include multiple layers, and thus, thickness reduction of the tabs 120 is further beneficial for reducing a dislocation phenomenon among the multiple layers of the tabs 120, which is caused by bending.

In this embodiment, the tabs 120 include the positive tab and the negative tab which are respectively arranged at two ends of the main body 110 in the longitudinal direction X. The positive tab and the negative tab may be arranged on the same side of the main body 110 in the width direction Y.

In embodiments not shown in the drawings, the positive tab and the negative tab may also be arranged on different sides in the width direction Y. According to a simulation result, compared to the arrangement that the positive tab and the negative tab are arranged on the same side of the main body 110 in the width direction Y, such arrangement can make current density more uniform.

As shown in FIG. 4, the tabs 120 are positioned at the middle portion of the main body 110 in the height direction Z. In the height direction Z of the cell 100, two vacancies are respectively formed at upper and lower portions of the tabs 120, which make the tabs 120 easier to bend.

The connection member 35 is positioned at the end portion of the cell 100 in the longitudinal direction X. In this embodiment, two connection members 35 are respectively arranged at two ends of the cell 100 in the longitudinal direction X. One connection member 35 is connected with the positive tab of the cell 100, and the other connection member is connected with the negative tab of the cell 100. The connection member 35 connected with the positive tab of the cell 100 is connected with the positive electrode part 31 on the top cover 30, and the connection member 35 connected with the negative tab of the cell 100 is connected with the negative electrode part 34 on the top cover 30, so that due to the connection members 35, connections between the tabs 120 and the corresponding electrode parts can be achieved.

In this embodiment, the first connection plates 351A and 351B are positioned outside of the guide plate 353 in the width direction, and in parallel to the end face of the main body 110, i.e., perpendicular to the longitudinal direction X of the cell 100.

When the connection member 35 is assembled with the cell, after the position of the guide plate 353 with respect to the cell 100 is determined, the first connection plates 351A and 351B are fixedly connected with the tabs 120 in a state of being in parallel to the longitudinal direction X of the cell 100, and then the first connection plates 351A and 351B are bent towards the outside of the guide plate 353 so as to complete assembling of the connection member 35 and the cell 100.

In some embodiments not shown in the drawings, after the position of the guide plate 353 with respect to the cell 100 is determined, the first connection plates 351A and 351B may also be fixedly connected with the tabs 120 in a state of being deviated from the longitudinal direction X of the cell 100 by a certain angle, and then the first connection plates 351A and 351B are bent towards the outside of the guide plate 353 so as to complete assembling of the connection member 35 and the cell 100.

In each above-mentioned assembling manner, a large operation space exists in the process of fixing the tabs 120 to the first connection plates 351A and 351B, which facilitates the fixed connection between the tabs 120 and the first connection plates 351A and 351B and beneficial for ensuring connection quality of the tabs 120 and the first connection plates.

In this embodiment, the rechargeable battery includes two cells 100 connected in parallel, and the tabs 120 of the two cells 100 having same polarity are respectively connected with two first connection plates 351A and 351B. In this embodiment, two cells 100 are symmetrically arranged.

In this embodiment, tabs 120 of each of the two cells 100 are positioned on one side close to the other cell 100. Namely, a portion of the tabs 120, which is connected with the main body 110, is positioned at the inner side of the rechargeable battery in the width direction Y.

The first connection plates 351A and 351B are bent to be in parallel to the end face of the main body 110 so as to effectively reduce a space occupied by the connection member 35 at the end portion of the rechargeable battery in the longitudinal direction X, and the tabs 120 extend out from one side of the main body 110 in the width direction Y so as to effectively reduce the thickness of the tabs 120 and further reduce a space occupied at the joint of the connection member 35 and the tabs 120, thereby effectively improving a space utilization rate of the rechargeable battery and the energy density of the rechargeable battery. Meanwhile, an activity space of the tabs 120 is reduced, and the probability that the tabs 120 are cracked by pulling and the probability that the tabs 120 are inserted into the main body 110 after being squeezed are reduced, so that the resultant risk of short circuit inside the battery is reduced, and a service life and safety performance of the cell 100 are improved.

Figure 6:
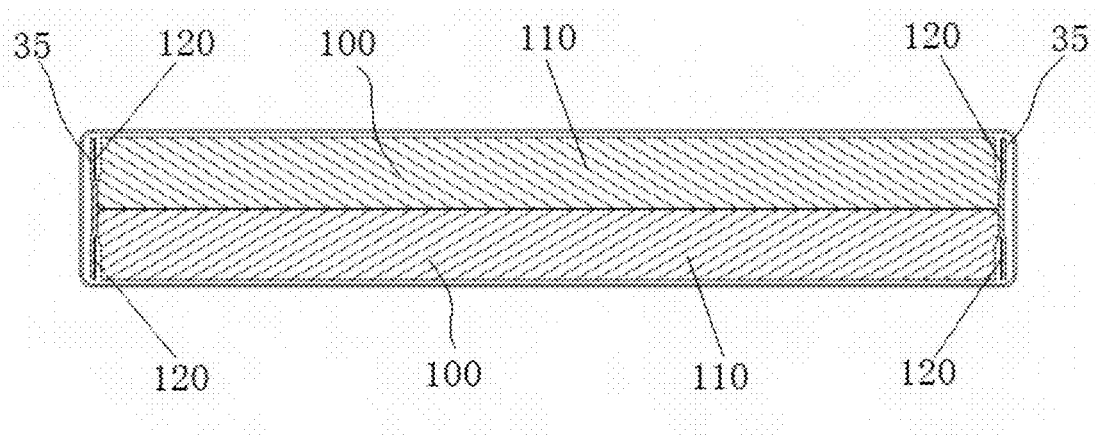
FIG. 6 is a structural schematic diagram showing a section-view of an A-A direction of FIG. 5.
Figure 7:
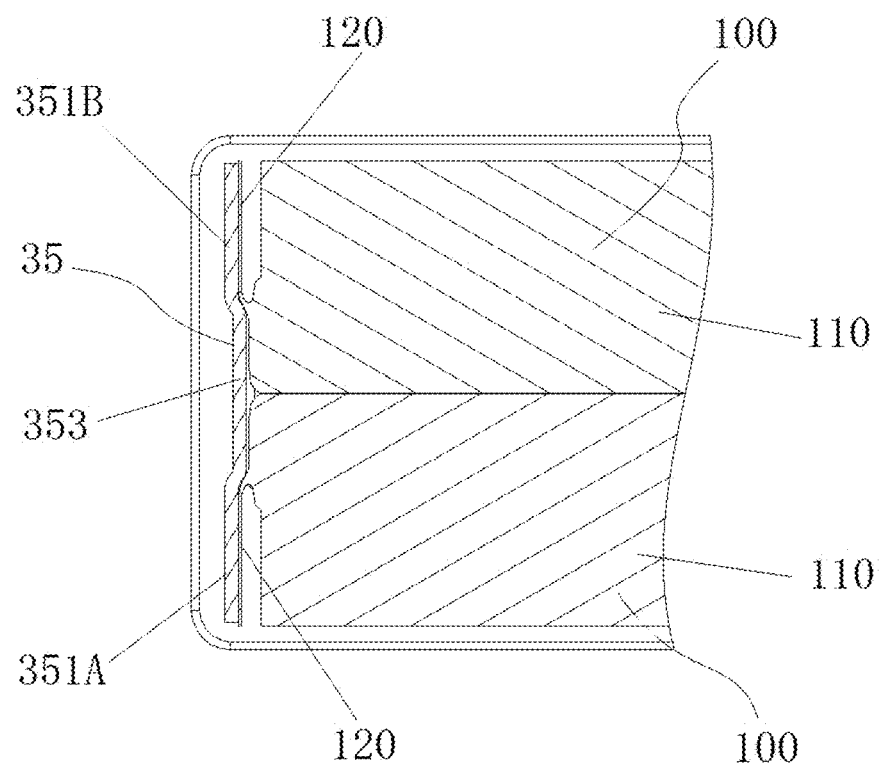
FIG. 7 is a partial structural schematic diagram of FIG. 6.

In addition, as shown in FIGS. 6 and 7, in a preferred embodiment, the guide plate 353 at least partially protrudes towards the cell 100 with respect to the first connection plates 351A and 351B to form a protrusion, and the protrusion is pressed against the tabs 120 of the cell 100. Portions of the tabs 120, which are connected with the main body 110, are positioned between the guide plate 353 and the main body 110.

The guide plate 353 at least partially protrudes towards the cell 100 with respect to the first connection plates 351A and 351B to form the protrusion, and the protrusion is pressed against the tabs 120 of the cell 100, and thus, when the rechargeable battery is vibrated or impacted, a portion of the guide plate 353, which protrudes towards the cell 100 with respect to the first connection plates 351A and 351B, can be in contact with the cell 100 to enable the connection member 35 to bear a stress, so that a pull crack phenomenon of the tabs 120, which is caused by vibration or impact, can be effectively relieved, and meanwhile, the activity space of the tabs 120 is reduced, and the probability that the tabs 120 are inserted into the main body 110 after being squeezed is reduced, so that the resultant risk of short circuit inside the battery is reduced. Due to reduction of both the probability that the tab 120s are cracked by pulling and the probability that the tabs are inserted into the main body 110, the service life and safety performance of the cell 100 can be improved.

In this embodiment, the connection between the first connection plates 351A and 351B of the connection member 35 and the tabs 120 of the cells 100 can be achieved by ultrasonic welding or laser welding or resistance welding, and meanwhile, the fixed connection with a certain strength is achieved. After welding connection, by bending the first connection plates 351A and 351B of the connection member 35 outwards, an internal space occupied by the connection member 35 and the cell 100 in the longitudinal direction X of the cell 100 is reduced.

In some embodiments, the tabs 120 of each of the two cells 100 can be positioned on one side away from the other cell 100.

As shown in FIGS. 10 to 13, in this embodiment, the tabs 120 of each of the two cells 100 are positioned on one side away from the other cell 100. Namely, a position of the tabs 120, which is connected with the main body 110, is positioned at the outer side of the rechargeable battery in the width direction Y.

In this embodiment, the guide plate 353 includes the main plate 3531 and a flanging 3532, the flanging 3532 is positioned at the side edge of the main plate 3531 in a width direction and extends towards a direction away from the cell 100, and the first connection plates 351A and 351B are connected with the main plate 3531 through the flanging 3532.

In this embodiment, the flanging 3532 is perpendicular to the main plate 3531. In other embodiments not shown in the drawings, the flanging 3532 may also be inclined towards the inner side of the main plate 3531, or the flanging 3532 may be inclined towards the outer side of the main plate 3531.

The first connection plates 351A and 351B are in parallel to the main plate 3531 after being bent with respect to the guide plate 353. In this case, both the first connection plates 351A and 351B and the main plate 3531 are perpendicular to the longitudinal direction X of the cell 100.

In embodiments not shown in the drawings, the first connection plates 351A and 351B and the main plate 3531 may also have a certain angle, and for example, the outer ends of the first connection plates 351A and 351B in the width direction may be closer to the main body 110 than the inner ends of the first connection plates 351A and 351B in the width direction.

Figure 10:
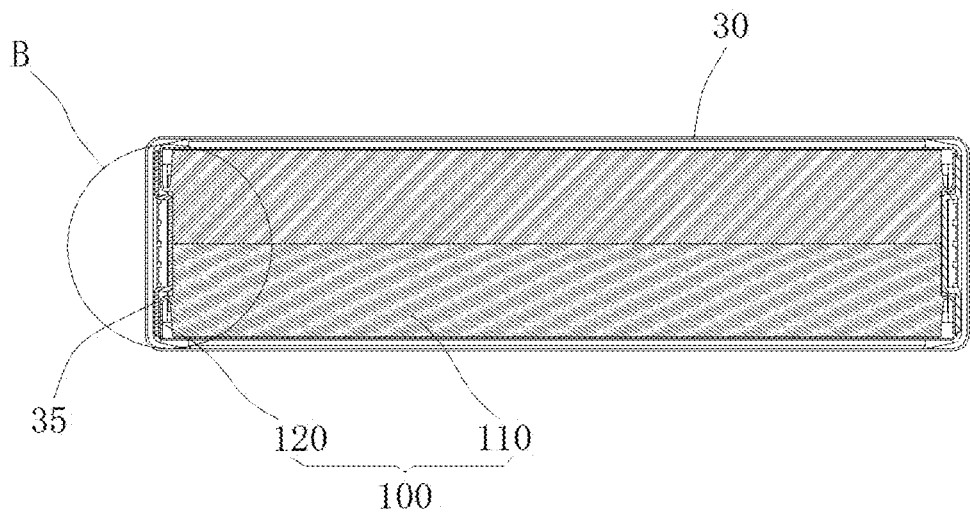
FIG. 10 is a structural schematic diagram showing a bottom view of a section-view of a rechargeable battery (in which a shell is not shown) according to one embodiment of the present disclosure.
Figure 11:
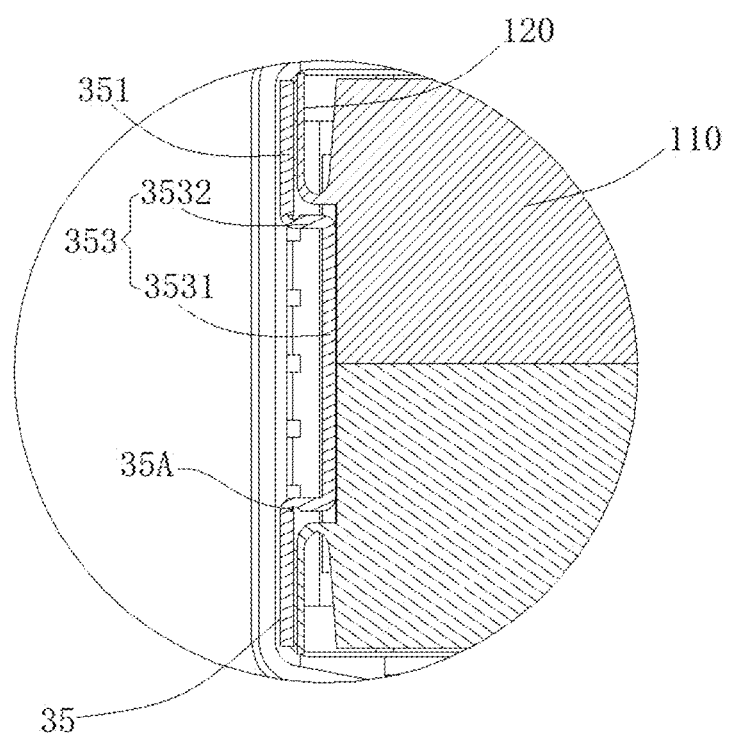
FIG. 11 is a structural schematic diagram showing an enlarged view of B portion in FIG. 10.

Preferably, in this embodiment, the whole guide plate 353 is in contact with a surface at one end of the main body 110. As shown in FIGS. 10 to 11, the main plate 3531 of the connection member 35 is in contact with the main body 110, i.e., is in contact with a surface at one end of the isolation film at the end portion of the cell 100 in the longitudinal direction X. As such, the tabs 120 nearly do not bear fixing and positioning functions of the cell 100 in the longitudinal direction X, so that the tabs 120 can be more effectively protected from being damaged. After being in contact with a surface at one end of the isolation film of the cell 100, the main plate 3531 of the connection member 35 compresses the cell 100 so as to take an effect of supporting, fixing and positioning the cell 100 along the longitudinal direction X of the cell 100 and prevent shaking of the cell 100 inside the shell 20 after the rechargeable battery is assembled.

Figure 12:
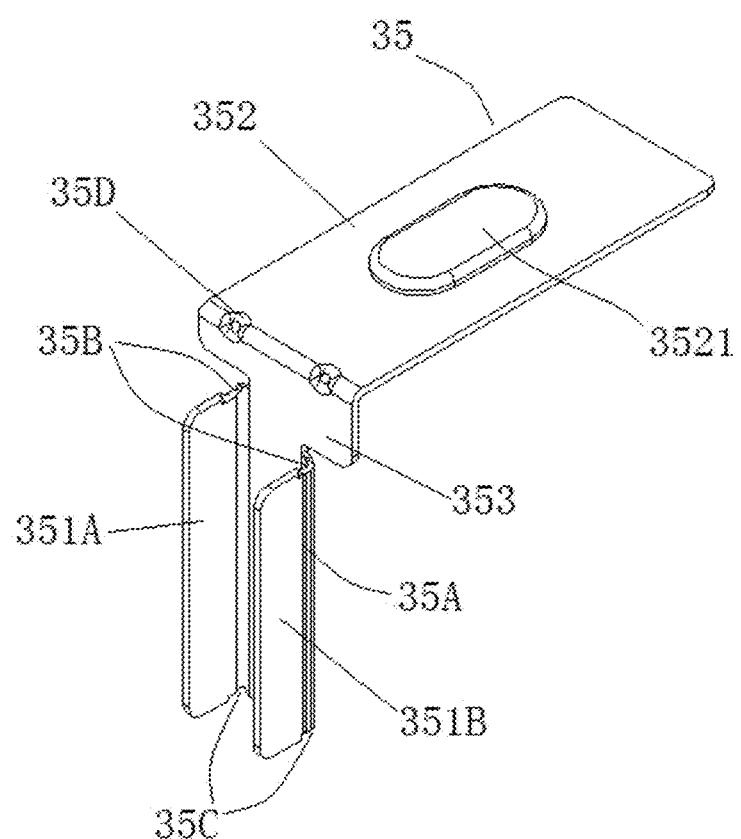
FIG. 12 is a structural schematic diagram showing a connection member of the rechargeable battery according to the embodiment shown in FIG. 10 before a first connection plate is bent with respect to the guide plate.
Figure 13:
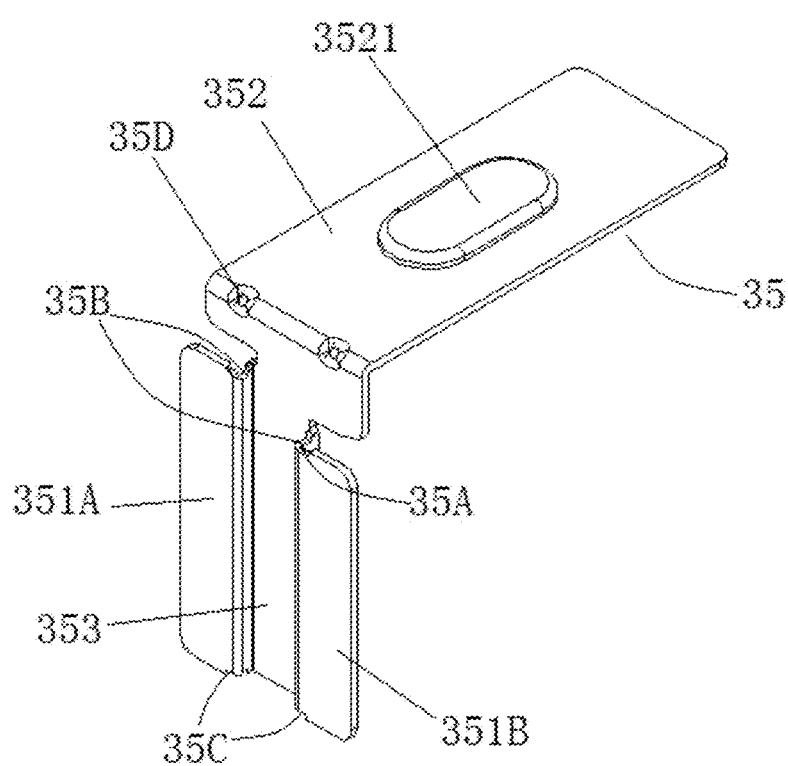
FIG. 13 is a structural schematic diagram showing a connection member shown in FIG. 12 after the first connection plate is bent with respect to the guide plate.

As shown in FIGS. 12 to 13, in this embodiment, at least one indentation 35A can be formed at a bent position between the first connection plate 351A and the guide plate 353, as well as between the first connection plate 351B and the guide plate 353.

By forming the indentations 35A, a weak link is formed between the first connection plates and the guide plate 353 at the positions of the indentations 35A, so that when the first connection plates are bent with respect to the guide plate 353, the bent positions are more accurate, which is beneficial to size accuracy of the connection member 35 after bending and is also beneficial for smoothly completing assembling of the cell 100, the connection member 35 and the shell 20 of the rechargeable battery. Moreover, due to the indentations 35A, the first connection plates are more labor-saving to bend, so that the damage to the cell 100 and the tabs 120 thereof, which is possibly generated due to bending, is reduced.

As shown in FIGS. 12 to 13, in this embodiment, a crack-arrest notch is formed at the end portion of the joint between the first connection plate 351A (or the first connection plate 351B) and the guide plate 353. A first notch 35B is formed at the root portion of the upper end of the joint between the guide plate 353 and the first connection plate, and a second notch 35C is formed at the root portion of the lower end of the joint between the guide plate 353 and the first connection plate (351A or 351B).

By forming the crack-arrest notches, it is not easy for the connection member 35 to be damaged at the end portion of the joint during the bending process, and the cracking problem at the end portion of the connection member 35 in the bending process is effectively solved.

In addition, in some embodiments not shown in the drawings, thicknesses of the first connection plate 351A and the first connection plate 351B may be less than that of the guide plate 353.

Compared to a connection member of which a first connection plate has the same thickness with the guide plate, the connection member 35 occupies a further reduced rechargeable battery space after the connection member 35 is bent, so that the energy density of the rechargeable battery can be further improved. Meanwhile, due to reduction of the thickness of the first connection plate, welding assembling quality of the first connection plates and the tabs of the rechargeable battery can be effectively improved. The thickness of the guide plate is still kept relatively large, which helps to reduce a resistance of the guide plate, thereby enabling an internal resistance of the rechargeable battery to meet demands and benefiting for ensuring electrical performance of the rechargeable battery. In addition, the thickness of the first connection plate is less than the thickness of the guide plate, which is also beneficial for bending the first connection plate, so as to benefit for ensuring relative positions of the connection member and the cell after bending, thereby benefiting for assembling and also benefiting for reducing damage to the main body of the cell or the tabs in the bending process.

Parts which are not illustrated in the embodiment corresponding to FIGS. 10 to 13 can be referred to related description in the embodiment corresponding to FIGS. 1 to 9.

The above embodiments should not constitute limitation to the present disclosure, for example:

In some embodiments not shown in the drawings, the first connection plate may also be flush with the plate face of the guide plate after being bent outwards.

Figure 15:
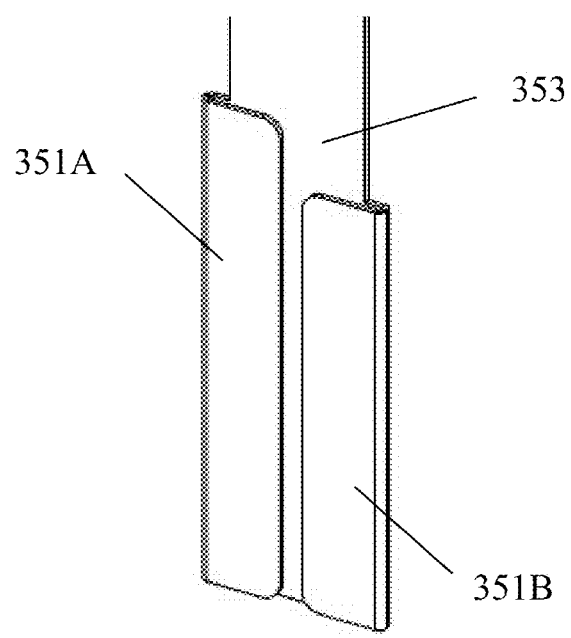
FIG. 15 is a structural schematic diagram showing a connection member after the first connection plate is bent towards an inside of the guide plate.

In an embodiment shown in FIG. 15, the first connection plate 351A and the first connection plate 351B are bent towards an inside of the guide plate 353. Preferably, the two first connection plates are not overlapped in the width direction of the guide plate.

In some embodiments not shown in the drawings, the rechargeable battery may further include a spacer fixedly connected with the first connection plates and the tabs, and the tabs are positioned between the first connection plate and the spacer so as to benefit for protecting the tabs and prolonging the service life of the rechargeable battery. The spacer can be electrically conductive.

In some embodiments not shown in the drawings, the first connection plate may also be connected with one group of cells 100. For example, each first connection plate is connected with one group of cells, the tabs are arranged on one side of the main bodies of the cells in the width direction Y, each of the two groups of cells may include two cells, and the tabs of each cell in two cells in one group is positioned on one side close to the other cell.

Each above embodiment of the present disclosure, as long as technical characteristics have no conflict, can refer to or combine related technical contents of other embodiments.

Finally, it should be illustrated that: the above embodiments merely are used for illustrating the technical solution of the present disclosure, but not limitative of the present disclosure; and although the present disclosure is illustrated in detail with reference to the preferred embodiments, those skilled in the art should understand that: modifications can still be made to the specific embodiments of the present disclosure or equivalent replacements can still be made to part of technical characteristics; and without departure from the spirit of the technical solution of the present disclosure, all the modifications and the equivalent replacements shall fall within the scope of the technical solution of the present disclosure.

What is claimed is:

1. A connection member for a rechargeable battery, comprising: a guide plate, two first connection plates and a second connection plate;

wherein the two first connection plates respectively connects to two sides of the guide plate in a width direction and arranged bendably with respect to the guide plate, the second connection plate connects to an upper end of the guide plate, wherein the guide plate comprises a main plate and an epitaxial plate, the two first connection plates are connected to the main plate, the epitaxial plate is spaced above one of the two first connection plates and extends towards an outside of the main plate along the width direction;

wherein top ends of the two first connection plates are at different heights;

each of the two first connection plates is configured to connect with tabs of a cell of the rechargeable battery, and the second connection plate is configured to connect with an electrode part of a top cover of the rechargeable battery.

2. The connection member according to claim 1, wherein a ratio of a height difference between the top ends of the two first connection plates to a plate height of the first connection plate which has a smaller plate height of the two first connection plates is 0.01 to 0.25.

3. The connection member according to claim 1, wherein the guide plate comprises two epitaxial plates, each of the two epitaxial plates corresponds to one of the two first connection plates.

4. The connection member according to claim 3, wherein:

a ratio of a gap between one of the two first connection plates which has a higher top end of the two first connection plates and the corresponding epitaxial plate to a plate height of one of the two first connection plates which has a smaller plate height of the two first connection plates is 0.006 to 0.15; and/or a ratio of a gap between one of the two first connection plates which has a lower top end of the two first connection plates and the corresponding epitaxial plate to a plate height of one of the two first connection plates which has a smaller plate height of the two first connection plates is 0.006 to 0.15.

5. The connection plate according to claim 1, wherein the second connection plate and the guide plate are integrally formed by bending, and at least one convex mark is formed at a bent position between the guide plate and the second connection plate.

6. The connection member according to claim 1, wherein at least one indentation is respectively formed at a bent position between one of the two first connection plates and the guide plate.

7. The connection member according to claim 1, wherein a crack-arrest notch is formed at an end portion of the joint between one of the two first connection plates and the guide plate.

8. The connection member according to claim 1, wherein a thickness of each of the two first connection plates is less than that of the guide plate.

9. A rechargeable battery, comprising two or more cells and a connection member according to claim 1, each of the two first connection plates being connected with tabs of a cell of the rechargeable battery, and the second connection plate being connected with an electrode part of a top cover of the rechargeable battery.

10. The rechargeable battery according to claim 9, wherein the two first connection plates are bent towards an outside of the guide plate along the width direction, respectively.

11. The rechargeable battery according to claim 10, wherein the guide plate at least partially protrudes towards a main body of the cells with respect to the first connection plates to form a protrusion, and the protrusion is pressed against the tabs of the cells or the protrusion is pressed against the main body of the cells.

12. The rechargeable battery according to claim 11, wherein the tabs extend from one side of main body of the cell in a width direction.

13. The rechargeable battery according to claim 10, wherein the guide plate is in contact with a surface at one end of the main body of the cells.

14. The rechargeable battery according to claim 9, wherein the two first connection plates are bent towards an inside of the guide plate along the width direction, respectively.

* * * * *